Figure 1:
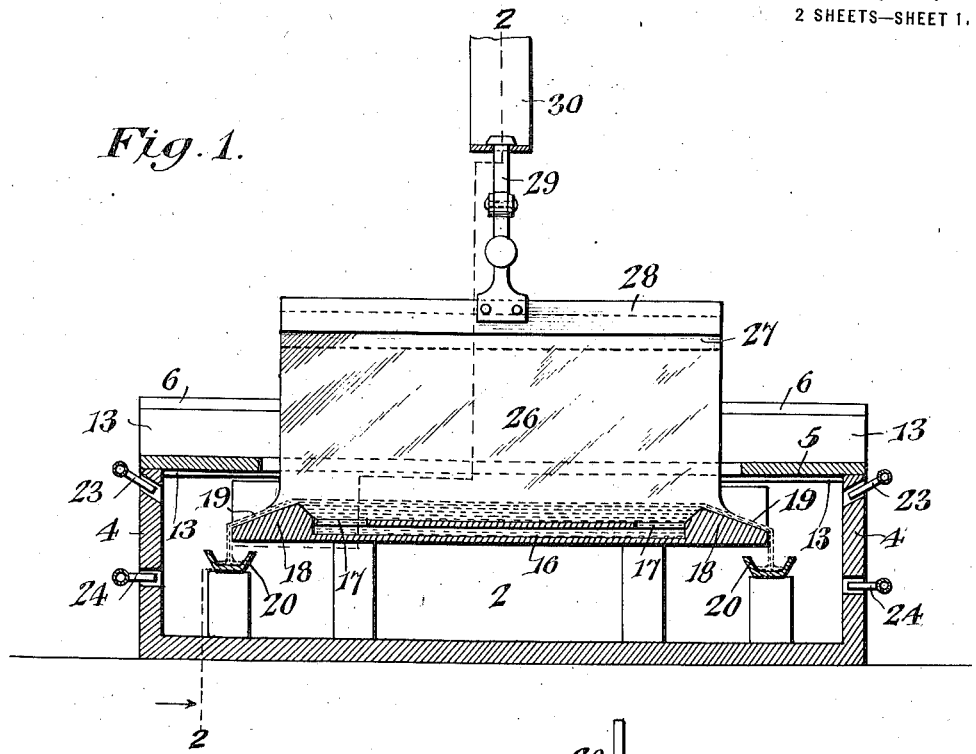

A. RASPILLAIRE.
METHOD OF AND MEANS FOR DRAWING SHEET GLASS.
APPLICATION FILED AUG. 7, 1914.

1,184,996.

Patented May 30, 1916.
2 SHEETS—SHEET 1.

WITNESSES
Jas. K. McCathran
F. T. Chapman

A. Raspillaire, INVENTOR
BY C. G. Siggers
ATTORNEY

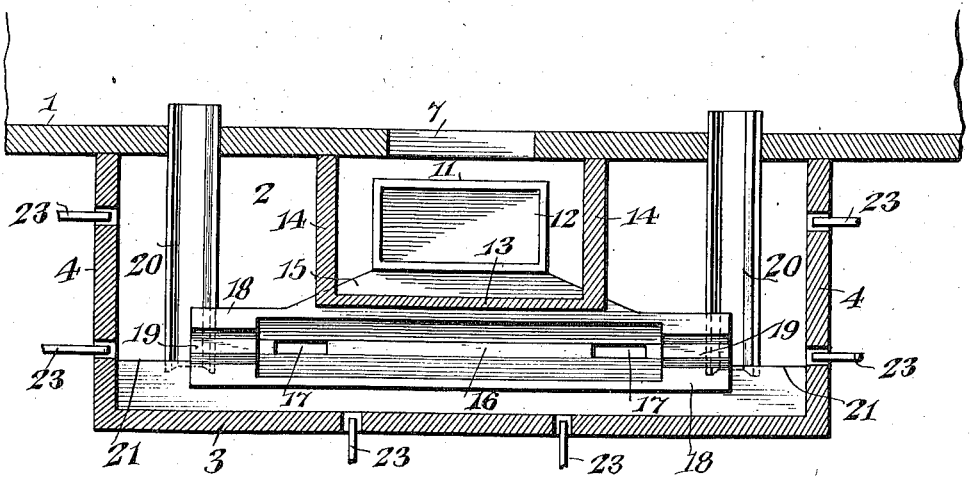
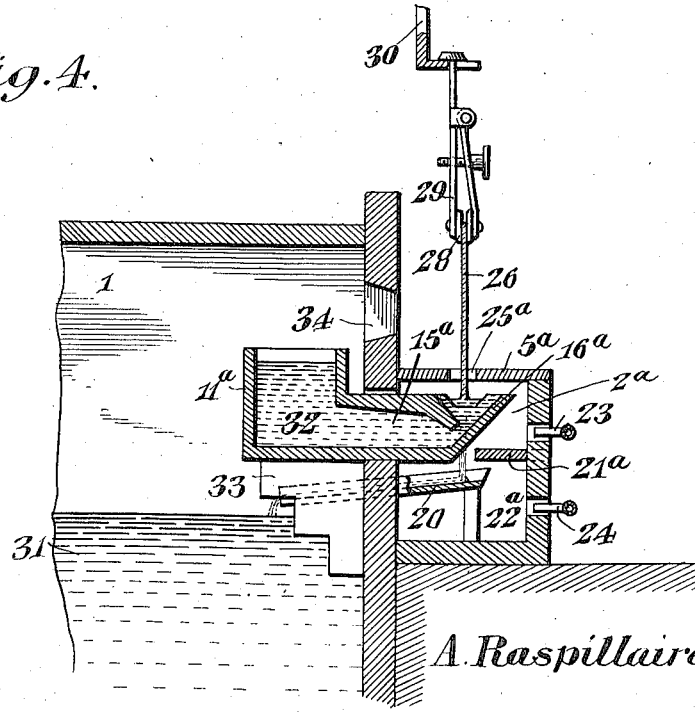

UNITED STATES PATENT OFFICE.

AUGUST RASPILLAIRE, OF MORGANTOWN, WEST VIRGINIA.

METHOD OF AND MEANS FOR DRAWING SHEET-GLASS.

1,184,996.　　　　　Specification of Letters Patent.　　Patented May 30, 1916.

Application filed August 7, 1914. Serial No. 855,665.

*To all whom it may concern:*

Be it known that I, AUGUST RASPILLAIRE, a citizen of the United States, residing at Morgantown, in the county of Monongalia and State of West Virginia, have invented a new and useful Method of and Means for Drawing Sheet-Glass, of which the following is a specification.

This invention has reference to drawing sheet glass, and its object is to make provision for the drawing of sheet glass whereby the drawn sheet will retain its full width without tendency to narrow during the drawing operation.

In drawing sheet glass it is customary to provide a piece of glass known as a bait which is dipped into a supply of molten glass, and this bait is slowly withdrawn from the molten glass carrying with it adherent glass in the form of a sheet which in thickness depends upon the degree of fluidity of the glass supply and the speed of movement of the bait away from the supply.

Heretofore difficulty has been encountered in the attempt to produce glass sheets by drawing, since as the bait recedes from the supply of molten glass there is a narrowing tendency ultimately resulting in the cessation of the operation. By the present invention this narrowing tendency is overcome by the production of a flow of the molten glass in a direction away from the side edges of the forming sheet, so that there is a constant tendency to widen the sheet, wherefore by a proper balance of forces the sheet may be drawn to approximately even width throughout and as long as may be practicable. This is brought about by producing an elongated supply of molten glass of the desired consistency with the end portions of the supply flowing oppositely one from the other, and then as the glass sheet is formed, the oppositely directed outflow of the glass at the end portions of the forming sheet maintains the width of the sheet and prevents any collapse of the side portions tending to narrow the sheet, the thickness of the sheet being maintained by a suitable regulation of the fluidity of the glass supply and the speed of movement of the forming sheet away from the supply.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications mark no material departure from the salient features of the invention.

Figure 2:
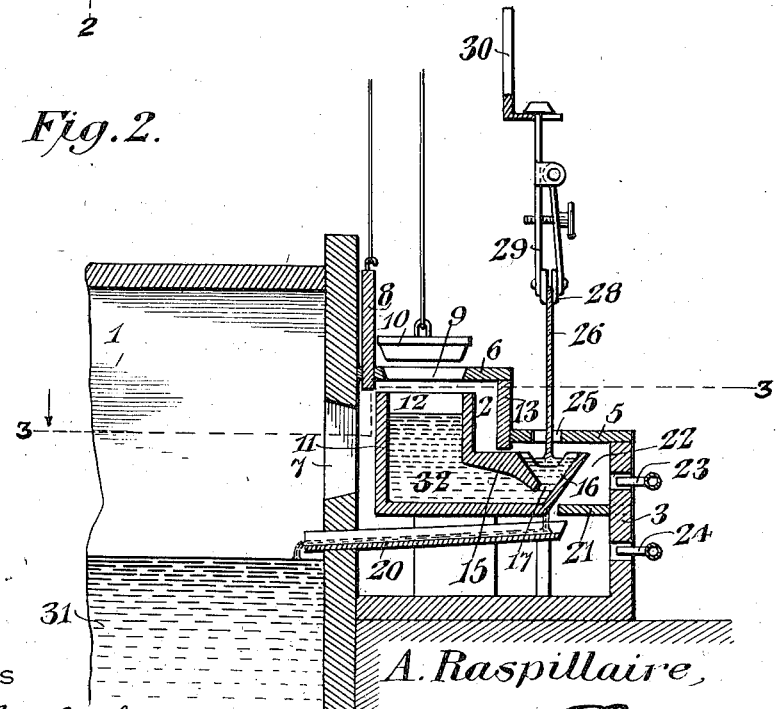

In the drawings:—Figure 1 is a section of an apparatus embodying the present invention, the section being taken on substantially the plane of the forming sheet of glass. Fig. 2 is a section on the line 2—2 of Fig. 1 with some parts shown in elevation. Fig. 3 is a section on the line 3—3 of Fig. 2 but omitting any showing of glass. Fig. 4 is a section similar to that of Fig. 2 but showing a modification of the structure.

Referring to the drawings there is shown a glass furnace 1 which may follow the usual lines of such a furnace and hence no description of the furnace is needed, and the showing is more or less schematic.

At one side of the furnace is a chamber 2 having a front wall 3, side walls 4, and a stepped cover 5, 6, respectively. The chamber 2 is in communication with the interior of the furnace 1 by a passageway 7, so that the heat of the furnace is communicated to the chamber 2. The passageway 7 may be restricted in area as desired by a damper or door 8 movable through the top 6 close to the opening 7 and entering the chamber 2 to any desired extent. Through the top 6 there is provided an opening 9 to which is fitted a plug 10 whereby the opening 9 may be closed or access to the chamber 2 may be had through this opening, as may be desired.

Within the chamber 2 there is located a pot or glass receptacle 11 having a mouth portion 12 in underriding relation to the opening 9, so that whenever desired glass from the furnace 1 may be ladled into the pot or receptacle 11.

Between the covers 5 and 6 is an upright wall 13 which together with the cover member 6 and side members 14 inclose the main body of the pot or receptacle 11. From one side of the receptacle 11 there is an expanding portion 15 ending in an elongated trough 16 communicating with the expanding portion 15 by ports 17 near the ends of the trough 16, but it will be understood that while it is preferred that the expanding duct 15 should communicate with the trough 16 by the end ports 17, other ports may be provided, or the two ports 17 may be sufficiently elongated to coalesce into a single port, which may be nearly or quite as extensive as the trough 16. At each end the trough 16 has terminal prolongations or extensions 18 forming end walls for the trough, while these prolongations are each provided with a channel 19 slanting downwardly from the corresponding end of the trough 16 toward the outer end of the extension 18. Underriding the outer end of each extension 18 is one end of a trough 20, the other end of which is carried through the adjacent wall of the furnace 1 and discharges thereinto, the trough 20 slanting at a suitable angle to direct molten glass to the interior of the furnace 1.

The upright wall 13 extends below the top member 5 sufficiently to come into close relation to the top portion of the expanding duct 15 and projecting inwardly from the wall 3 into close relation to the bottom of the trough 16 is a plate 21. The trough 16 with the downward projection of the wall 13 and the plate 21 define a chamber 22 in which the trough 16 is located, and wherein the trough is protected to a sufficient degree from the intensity of heat of the furnace. The chamber 22 is entered by burners 23 and other burners 24 are located wherever expedient for a purpose which will presently appear.

The top 5 immediately over the trough 16 is provided with an elongated opening 25 through which a glass sheet 26 is extracted as formed.

In order to start the glass sheet, there is provided a glass strip indicated at 27, and which is known as a bait. This bait is held by clamps 28 supported by a hanger 29 suspended from a carrier 30 such as is used in glass works for drawing glass, and which is assumed to be suspended by suitable devices whereby the carrier may be lowered and lifted as desired.

In the drawings there is shown in the furnace 1 a supply 31 of molten glass which is assumed to have the desired degree of fluidity. A portion of this glass is ladled into the glass pot or receptacle 11, and in Fig. 2 the glass so ladled is indicated at 32. The pot 11 is maintained at such a heat that the glass will flow therefrom through the duct 15, and by way of the ports 17 into the trough 16 and rising therein ultimately comes to the level of the channels 19 and overflowing the upper ends of these channels gravitates along the declining or sloping surfaces of the channels to finally fall into the troughs 20 being conducted by the latter back into the furnace 1, the glass being always maintained at a sufficient degree of fluidity to flow by gravity. The necessary degree of heat for maintaining the flowable condition of the glass is brought about by the burners 23 and 24, which are regulated as may be needed. It is of importance that the glass within the trough 16 be of less fluidity than elsewhere, so that it is more quickly chilled and solidified than would otherwise be the case, and the flow of glass through the channels 19 is correspondingly sluggish.

If, now, it be assumed that there is a supply of molten glass in the trough 16 constantly fed by more fluid streams entering the trough through the ports 17, there will be a constant outflow of molten glass from the ends of the trough 16 through the channels 19. The conditions are under these circumstances proper for the drawing of a glass plate, whereupon the bait 27 is lowered through the opening 25 until engaging the surface of the glass within the trough, and this bait may be slightly longer than the trough, so as to in a small measure overlap the inner high ends of the channels 19, whereby the glass is outflowing from the trough. The molten glass adheres to the lower edge of the bait which has been properly heated for the purpose, and now the bait is lifted at a suitable speed drawing with it an amount of glass from the trough which quickly chills to a solid condition as it emerges from the chamber 22 where the temperature may be relatively low, so that the molten glass is relatively thick or semi-fluid.

As the forming glass plate is withdrawn from the trough 16 the supply is maintained by the higher level of molten glass within the receptacle 11, and by a proper regulation of the heat the glass will flow from the receptacle 11 into the trough 16 at a proper speed to maintain the level within the trough about constant, and also maintain the overflow at the ends of the trough through the channels 19. The tendency of this overflow is to widen or spread out the glass sheet at such point, but by a suitable regulation of the speed of withdrawal of the glass sheet and the temperature of the molten glass within the trough and at the overflow ends, the width of the forming glass sheet is maintained at a close approximation to uniformity, whereby the tendency of the glass sheet to narrow is counteracted by the spreading of the glass sheet due to the outflow of molten glass at opposite ends of the feeding trough, the flow at one end being in a direction opposite to that at the other end.

Since the thickness of the glass sheet is dependent upon the speed of formation, a slowly formed sheet will be thicker than a quickly formed sheet, wherefore either plate glass or window glass is readily produced by the present invention by the simple expedient of adjustment of speed and temperature.

In Fig. 4 there is shown a chamber $2^a$ in which is provided a sub-chamber $22^a$ divided off from the chamber $2^a$ by a plate $21^a$ and a cover $5^a$ provided with an opening $25^a$ serves to close in the chamber $2^a$ and the sub-chamber $22^a$. A pot or receptacle $11^a$ is provided generally similar to the pot or receptacle 11, but in Fig. 4 the main part of the pot or receptacle $11^a$ is lodged within the furnace 1 while a duct continuation $15^a$ of the pot $11^a$ is extended through the corresponding wall of the furnace 1 into the chamber $2^a$ with a trough portion $16^a$ lodged within the chamber section $22^a$. Since the pot $11^a$ is in part within the furnace 1 a support 33 is provided for upholding it. The structure of Fig. 4 is provided with return troughs 20 and burners 23, 24, as in the other form. Since the pot $11^a$ is in part within the furnace 1 access to this pot for filling is had through an opening 34 in the corresponding wall of the furnace, this opening being, of course, closed when not in use.

In Fig. 4 a supply of glass 31 is shown in the furnace 1 and the supply of glass 32 is shown in the pot $11^a$. The operation of the invention as disclosed in Fig. 4 is the same as that shown in the other figures of the drawing.

It will be understood, of course, that wherever intense heat is to be withstood refractory material is used as is customary in the glass making industry.

It is not uncommon to use rollers in the formation of sheet glass and therefore it will be understood that rollers may be employed in conjunction with or independently of other means for raising the forming glass sheet.

What is claimed is:—

1. The method of forming sheet glass, which consists in providing an elongated narrow body of molten glass with the end portions flowing downwardly away from the body of molten glass, and drawing the sheet from such elongated supply of molten glass with the side edges of the sheet being drawn directly from the down flowing end portions of the supply.

2. The method of forming sheet glass, which consists in providing an elongated narrow body of molten glass with the end portions spontaneously flowing oppositely and downwardly away from the body of molten glass, the distance separating the oppositely down-flowing end portions of the body of glass being less than the width of the sheet to be drawn, and drawing a glass sheet from such body of glass with the edge portions of the sheet encroaching on the down flowing end portions of said body of molten glass.

3. The method of drawing sheet glass, which consists in providing an elongated narrow body of molten glass with a constantly active replenishing supply therefor at a higher level, causing the end portions of the body of molten glass to gravitate in opposite directions away from the body of glass, and drawing a sheet of glass from the body of molten glass with the edge portions of the sheet overlapping the downwardly flowing end portions of the body of glass.

4. The method of drawing sheet glass, which consists in withdrawing the glass in sheet form from a supply of molten glass with those portions of the supply from which the edges of the sheet are directly drawn gravitating away from the corresponding portions of the body of glass.

5. The method of drawing sheet glass, which consists in withdrawing the glass in sheet form from a supply of molten glass with those portions of the supply from which the edges of the sheet are drawn gravitating away from the corresponding portions of the body of glass, and replenishing the body of glass from which the sheet is being drawn by directing additional supplies of molten glass to said body immediately adjacent to the outflowing end portions of said body of glass.

6. A glass furnace having associated therewith an elongated trough for containing molten glass and located at a higher level than the level of molten glass in the furnace, said trough having overflow channels at opposite ends to produce a spontaneous flow of glass at said ends in opposite directions therefrom, and ducts for receiving the overflow and slanting toward and entering the furnace to direct the glass overflowing from the trough into said furnace, said trough being provided with a glass receptacle at a higher level than and discharging into the trough for receiving glass removed from the furnace to constitute a replenishing supply for the trough.

7. A glass furnace having associated therewith an elongated trough for containing molten glass and located at a higher level than the level of molten glass in the furnace, said trough having overflow channels at opposite ends to produce a spontaneous flow of glass at said ends in opposite directions therefrom, and ducts for receiving the overflow and slanting toward and entering the furnace to direct the glass overflowing from the trough into said furnace, said trough being provided with a glass receptacle at a higher level than and discharging into the trough for receiving glass removed from the furnace to constitute a replenishing supply for the trough, and said receptacle having means of communication with the trough entering the latter at the end portions of said trough adjacent to the overflow channels.

In testimony that I claim the foregoing as my own, I have hereto affixed my signature in the presence of two witnesses.

AUGUST RASPILLAIRE.

Witnesses:
IDA BOSLEY,
ROBT. E. GUY.